United States Patent
Verbakel et al.

(10) Patent No.: US 9,958,556 B1
(45) Date of Patent: May 1, 2018

(54) DIRECT CONVERSION RADIATION DETECTOR

(71) Applicant: KONINKLIJKE PHILIPS N.V., Eindhoven (NL)

(72) Inventors: Frank Verbakel, Helmond (NL); Cornelis Reinder Ronda, Aachen (DE); Herfried Karl Wieczorek, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days. days.

(21) Appl. No.: 15/501,193

(22) PCT Filed: Jun. 28, 2016

(86) PCT No.: PCT/EP2016/064930
§ 371 (c)(1),
(2) Date: Feb. 2, 2017

(87) PCT Pub. No.: WO2017/005532
PCT Pub. Date: Jan. 12, 2017

(30) Foreign Application Priority Data

Jul. 9, 2015 (EP) .................................. 15176076

(51) Int. Cl.
*G01T 1/24* (2006.01)
(52) U.S. Cl.
CPC .................................. *G01T 1/241* (2013.01)
(58) Field of Classification Search
CPC .................................. G01T 1/24; G01T 1/241
See application file for complete search history.

(56) References Cited

U.S. PATENT DOCUMENTS

| 9,664,558 B2 | 5/2017 | Herrmann |
| 2012/0223236 A1 | 9/2012 | Shah |

FOREIGN PATENT DOCUMENTS

| JP | 2012180399 | 9/2012 |
| WO | 2014/032874 | 3/2014 |

OTHER PUBLICATIONS

Kamada et al. "Composition Engineering in Cerium-Doped (Lu,Gd)3(Ga,Al)5O12 Single-Crystal Scintillators". Cryst. Growth Des. 2011, (11), pp. 4484-4490.*

* cited by examiner

*Primary Examiner* — Casey Bryant

(57) ABSTRACT

The present invention relates to a direct conversion radiation detector for wherein the direct conversion material comprises a garnet with a composition of $Z_3(Al_xGa_y)O_{12}$:Ce, wherein Z is Lu, Gd, Y, Tb or combinations thereof and wherein y is equal to or greater than x; and preferably Z comprises Gd. Suitable garnets directly convert radiation, such as x-rays or gamma-rays, into electronic signals. Preferably photoluminescence of the garnet is low or absent. The detector is particularly suitable for use in x-ray imaging devices, such as computed tomography. In some embodiments photoluminescence of garnets might be used to construct a hybrid direct-indirect conversion detector, which may be particularly suitable for use with Time-of-Flight PET.

14 Claims, 5 Drawing Sheets

DIRECT CONVERSION RADIATION DETECTOR

CROSS REFERENCE TO RELATED APPLICATIONS

This application is the U.S. National Phase application under 35 U.S.C. § 371 of International Application No. PCT/EP2016/0654930, filed Jun. 28, 2016, published as WO 2017/005532 on Jan. 12, 2017, which claims the benefit of European Patent Application Number 15176076.6 filed Jul. 9, 2015. These applications are hereby incorporated by reference herein.

FIELD OF THE INVENTION

The present invention generally relates to a direct conversion radiation detector, a radiation imaging method and an imaging system.

BACKGROUND OF THE INVENTION

Scintillators are widely used as detectors for spectroscopy of X-rays and gamma-rays. Incoming ionizing radiation is absorbed by the scintillator, which re-emits a photon of a different (e.g. visible) wavelength, which then, in a photosensor, such as a photodiode, an avalanche photodiode or a silicon photomultiplier, may be used to generate an electronic signal, which may subsequently be processed to imaging data. Radiation detectors based on scintillators are commonly used in e.g. medical imaging, security scanning or astrophysics. Important properties for the scintillation crystals used in these applications include high light output, high gamma-ray stopping efficiency, fast response, low cost, good proportionality, and minimal afterglow. There is continued interest in new scintillator materials that have these properties. In particular garnets are a group of materials that have shown to be of interest for use as scintillator material.

A garnet is an inorganic crystalline material, in many cases comprising a mixed oxide composition containing Gd, Lu, Al and/or Ga. Often dopants like Cerium, which forms an emission center, is included to increase light output upon X-ray irradiation, as is for instance known from US patent application US2012/0223236A1.

X-ray or gamma-ray detection with scintillators is an indirect detection method, since it requires the photosensor to detect the light emitted by the scintillator. A drawback of such an indirect detection method is (high) loss of energy due to the two steps: there is a loss in converting the radiation to light and afterwards in the photodiode to electrons. Due to the resulting (relatively) low number of electrons in the photosensors, the energy resolution of the detector is limited.

An alternative method to detect radiation is direct detection. This uses a semiconductor to directly convert the energy of absorbed X-ray or gamma-ray photons into electron-hole pairs. The electrons may be processed into an electrical signal without the use of, and therefore without the above-mentioned losses associated with a further functional layer. Cadmium Telluride (CdTe) or Cadmium Zinc Telluride (CZT) are the most commonly used direct conversion materials in direct conversion radiation detectors. If performed in a so-called photon counting mode, this enables measuring the energy of each of the radiation quanta absorbed with much higher energy resolution (spectral response). This spectral information is very important to improve image resolution and quality, e.g. for diagnostics. WO2014/032874A1 discloses a hybrid photodiode with an organic direct conversion layer with scintillating garnet fillers dispersed therein. However, these materials are typically single crystals, which are very difficult to make and therefore expensive. Also, it is quite difficult to modify these materials to optimize or tune their properties for different detector systems.

SUMMARY OF THE INVENTION

Embodiments according to the present invention are directed to a direct conversion radiation detector comprising a direct conversion layer comprising a direct conversion material for directly converting incoming radiation from a radiation source into electron and hole pairs; and a first electrode mounted on the direct conversion layer facing the radiation source; and a second electrode mounted on an opposite side of the direct conversion layer compared to the first electrode; and means for applying an electrical potential between the first electrode and the second electrode. The direct conversion material comprises a garnet. The garnet has a composition of $Z_3(Al_xGa_y)_5O_{12}:Ce$, wherein Z is Lu, Gd, Y or Tb (or combinations thereof) and wherein y is equal to or greater than x; and preferably Z comprises Gd.

In another preferred embodiment the second electrode is pixelated.

In another preferred embodiment the detector comprises a photosensor mounted behind the second electrode with respect to the direct conversion layer for converting visible light formed in the direct conversion layer to an electronic signal, wherein the second electrode is transparent to visible light and wherein the garnet has a composition of $Z_3(Al_xGa_y)_5O_{12}:Ce$, wherein Z is Lu, Gd, Y, Tb or combinations thereof and wherein y is equal to or greater than x; and preferably Z comprises Gd.

In another preferred embodiment the detector comprises an integrated circuit for processing electronic signals generated in the direct conversion radiation detector.

In another preferred embodiment the detector comprises an integrated circuit for processing electronic signals generated in the direct conversion radiation detector.

In another preferred embodiment the detector comprises a transparent re-routing layer for re-routing each pixel of the pixelated electrode to the integrating circuit.

Further embodiments according to the present invention are directed to a radiation imaging method using the direct conversion detector according to the present invention.

A particularly interesting embodiment of the radiation imaging method wherein the radiation source is a decaying radioactive material, comprises detecting two simultaneously formed gamma-ray photons with at least the radiation detector; determining a difference in detection time between the two simultaneously formed photons; generating a timestamp based on the determined difference in detection time, wherein the step of generating a first electronic signal includes using the generated timestamp as input.

Further embodiments according to the present invention are directed to an imaging system comprising the direct conversion detector according to the present invention.

Still further aspects and embodiments of the present invention will be appreciated by those of ordinary skill in the art upon reading and understanding the following detailed description. Numerous additional advantages and benefits will become apparent to those of ordinary skill in the art upon reading the following detailed description of preferred embodiments.

The invention may take form in various components and arrangements of components, and in various process operations and arrangements of process operations. The drawings are only for the purpose of illustrating preferred embodiments and are not to be construed as limiting the invention. To better visualize certain features may be omitted or dimensions may be not according to scale.

DETAILED DESCRIPTION OF EMBODIMENTS

Figure 1:
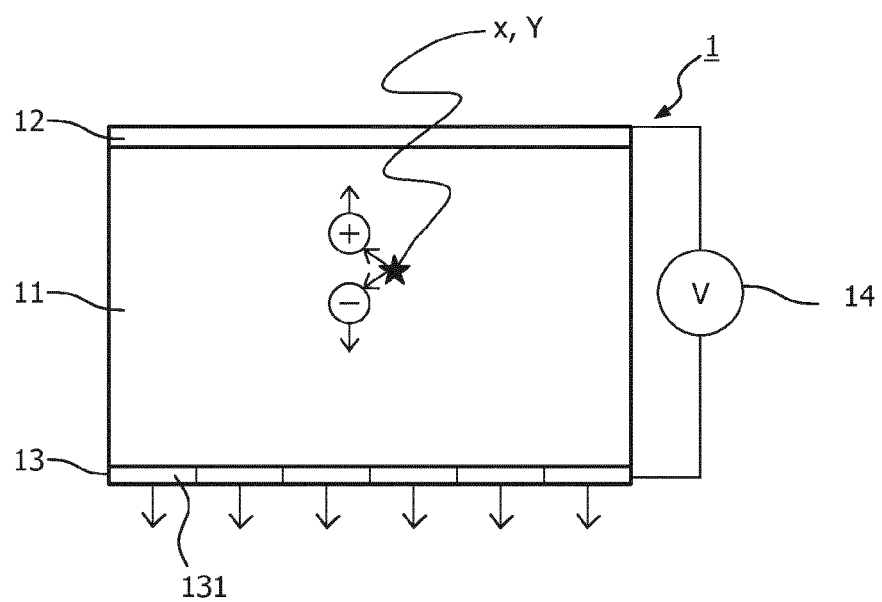
FIG. 1 shows a schematic representation to explain the principle of direct conversion detection with a pixelated direct conversion radiation detector.

FIG. 1 shows a highly schematic depiction of the known principle of direct conversion radiation detection. This principle and the invention are illustrated using x-ray (x) and gamma-ray radiation (Y), but the concept would be valid for any other type of radiation that may be directly converted into electronic signals by a direct conversion layer.

In FIG. 1 several essential layers of a direct conversion radiation detector 1 are shown. A bulk of the detector 1 is formed by direct conversion layer 11 comprising a direct conversion material. The direct conversion material 11 may be composed of a single-crystal semiconductor material, which is an intrinsic material or has a fully depleted p-i-n structure (due to electrical contacts). $Cd_xZn_{1-x}Te$ (Cadmium Zinc Telluride, commonly abbreviated to CZT) is a suitable known semiconductor material. Also Cadmium Telluride (CdTe) is often used as a direct conversion material. The direct conversion layer 11 is placed between a first electrode (cathode) 12 and a second electrode (anode) 13, wherein the first electrode faces a direction from which radiation x, Y may be emitted towards the radiation detector 1. The first electrode 11 and second electrode 12 are connected to an electrical power source 14 (or more than one source). The first electrode 11 is held at a negative bias potential, while the second electrode 12 is held at a less repelling (usually an attracting positive) potential. The first electrode 12 forms a continuous layer on the direct conversion material layer 51 and is generally transparent to photons x, Y with an energy level to be detected by the radiation detector 1. The second electrode 13 is on the opposite side of the direct conversion layer 11 and is normally subdivided into a row or grid of detector pixels 131.

When a photon x, Y passes the first electrode 12 and penetrates into the direct conversion material layer 11, the photon x, Y interacts with direct conversion material to generate numerous electron-hole pairs. The positively charged holes drift towards the strongly negatively charged first electrode 12, while the negatively charged electrons drift towards the more positively charged second electrode 13. When the electrons approach second electrode 13, a signal is induced from each detector pixel 131, which, after collection, is indicative of a count of electrons that approached that particular electrode pixel 131. Which may then be further processed by processing units and eventually displayed on a display unit to a user as written information or as a reconstructed image of (part of) an examined object.

Figure 2:
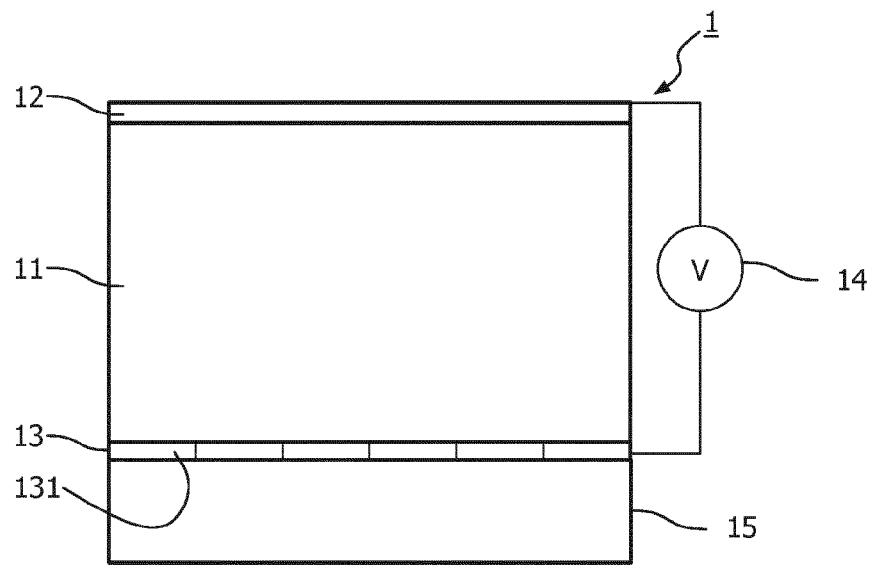
FIG. 2 shows a schematic representation of a first embodiment of a direct conversion radiation detector according to the present invention.

FIG. 2 shows a schematic depiction of an embodiment of a radiation detector 1 according to the present invention. This embodiment comprises the same elements as those shown in FIG. 1, but in this case the direct conversion layer 11 comprises a garnet as a direct conversion material. The direct conversion material may be made up completely, or at least mostly, made from a garnet. The used garnet acts in the same way as direct conversion material as described previously: when a photon x, Y is absorbed in the garnet electron-hole pairs are formed, which are transported to the second electrode 13 and first electrode 12 respectively. An electronic signal indicative of the electron count for each detector pixel 131 is sent to an integrated circuit 15, which is in electrical connection with the second electrode 13 to process the electronic signals into image data. In this embodiment the integrated circuit 15 is directly mounted to the second electrode 13, but it may also be placed away from the second electrode 13.

Most types of garnets that do not show very low (or preferably no) photoluminescence emission under ionizing radiation are suitable for use in context of this invention. It is an insight of the present invention that garnets, particularly non- or low-luminescing garnets, actually may be used as direct conversion materials. Normally garnets are used in the field of radiation detection for their good photoluminescence properties, which could be detrimental to the efficiency as direct conversion materials and a skilled person would therefore not contemplate to use a garnet he is familiar with as a direct conversion material. Examples of particularly suitable garnet materials are Cerium (Ce) doped Aluminium (Al)-Gallium (Ga) based garnets with a composition of $Z_3(Al_xGa_y)_5O_{12}$:Ce, wherein Z is chosen from Lutetium (Lu), Gadolinium (Gd), Yttrium (Y) or Terbium (Tb).

An advantage of using garnets instead of known direct conversion materials such as CdTe or CZT is that garnets are cheaper to produce, there is more variety in types and they can be tuned to optimize properties for a certain system, which is another insight of the present invention. The fabrication process of garnets enables tuning garnet material properties to a desired specification. For example, Cerium content is tuned for maximum light output and speed for garnets that are used as indirect scintillator materials. For the present invention the garnet material properties need to be tuned in such a manner that the garnet can be used for direct conversion. As such, it is necessary to limit recombination of electron-hole pairs and to enable charge separation to occur (which is actually opposite of what is needed for scintillator materials). Garnets used for the present invention should preferably not show luminescence, since this is a loss process for direct conversion. As in general undoped materials show lattice related emission (e.g. due to self-trapped excitons), preferably $Ce^{3+}$ doped garnets are used in which the excited $Ce^{3+}$ ion ionizes to $Ce^{4+}$, rendering an electron in the conduction band, which is counted. In the garnets used in the context of the present invention, holes are trapped on the $Ce^{3+}$ ions. Such ionization of $Ce^{3+}$ ions is especially seen in garnets that have a low energetic distance between the excited d-level states of $Ce^{3+}$ ions and the conduction band. From literature it is known that Gd, Lu or Y-based Al—Ga garnets with a Gallium content higher than the Aluminum content are especially prone to ionization of $Ce^{3+}$ ions. As such, compositions described by $(Lu,Gd,Y,Tb)_3(Al_xGa_y)_5O_{12}$:Ce, with Ga content greater or equal than the Al content (y>=x), are particularly interesting garnets as direct converters in the context of the present invention. The composition may be tuned such that both luminescence and direct conversion can be detected. When done properly, the total received signal increases and better quality images may be obtained.

Furthermore, garnets are sintered in their fabrication process and said sintering step will need to be performed such that grain boundaries are limited to prevent conduction pathways and defect centers. This requirement is similar for the current garnet based systems for indirect scintillation as defect minimization limits recombination and increases light output. Sintering is typically carried out at temperatures above 1600° C., preferably in a temperature range between 1650° C. and 1780° C., most preferably in a temperature range between 1675° C. and 1750° C. in vacuum. As garnets can be produced using sintering processes in ceramic form, the garnets used in the present invention will be significantly cheaper than the common direct converters based on CZT/CdTe, which are applied as single crystal. Moreover, a plurality of ceramic garnet compositions is already available and new types are still developed and produced, which offers the possibility of fine tuning a number of significant parameters, like the ratio of direct- and indirect conversion, the stopping power and the $Ce^{3+}$ emission spectrum. This is much more difficult, if not impossible, with single crystals.

Figure 3:
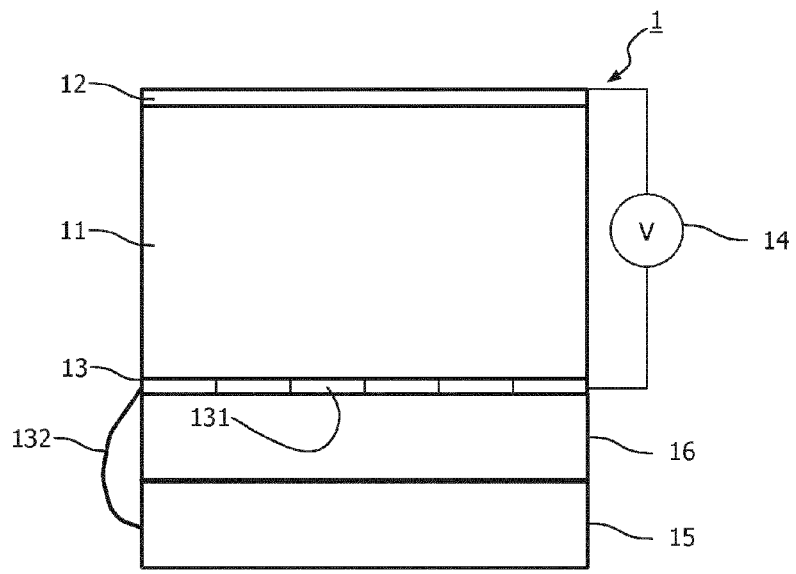
FIG. 3 shows a schematic representation of a second embodiment of a direct conversion radiation detector according to the present invention.

FIG. 3 shows a further embodiment of a radiation detector according to the present invention which combines direct conversion and indirect detection. As with the previously described embodiment, the direct conversion layer 11 comprises a garnet. However in this case the garnet is one chosen from scintillator garnets that are currently used for indirect detection. For instance a garnet wherein y is preferably between 0.4 and 0.6, more preferably y is about 0.5 (e.g. $Gd_3Al_{2.5}Ga_{2.5}O_{12}$:Ce). The term 'about' means that in the context of the present application a property value may in practice vary somewhat, e.g. 10% in either direction. These are highly efficient group of garnets used in known scintillators. Another good option (on its own or in combination with the previously mentioned types) would be a garnet wherein Z comprises Gd and Lu with a Gd:Lu ratio of about 2:1. These garnets are particularly suitable for use in PET imaging. As with common indirect detectors a photosensor 16, such as a photodiode, an avalanche photodiode or a silicon photomultiplier, is placed between the direct conversion layer 11 and the integrated circuit 15. The second electrode 13 is sandwiched between the direct conversion layer 11 and the photosensor 16. This arrangement is a hybrid between an indirect conversion detector (which does not have the first electrode 12 and second electrode 13) and a direct conversion detector (which does not have the photosensor 16). This arrangement allows the electrical power source 14 to apply an electrical field on the direct conversion layer to separate part of the electron-hole pairs (direct conversion), while others recombine to generate visible light (scintillation).

The visible light generated within the direct conversion layer 11 is transmitted to the photodiode, where it is converted into a second electronic signal. Because of this the second electrode 13 needs to be transparent to the appropriate visible light spectrum in order not to block the visible light for the indirect conversion detector. The transparent second electrode 13 may comprise known materials for transparent electrodes, such as for instance Indium Tin Oxide (ITO) or Aluminium-doped Zinc Oxide (ZnO:Al).

Figure 4:
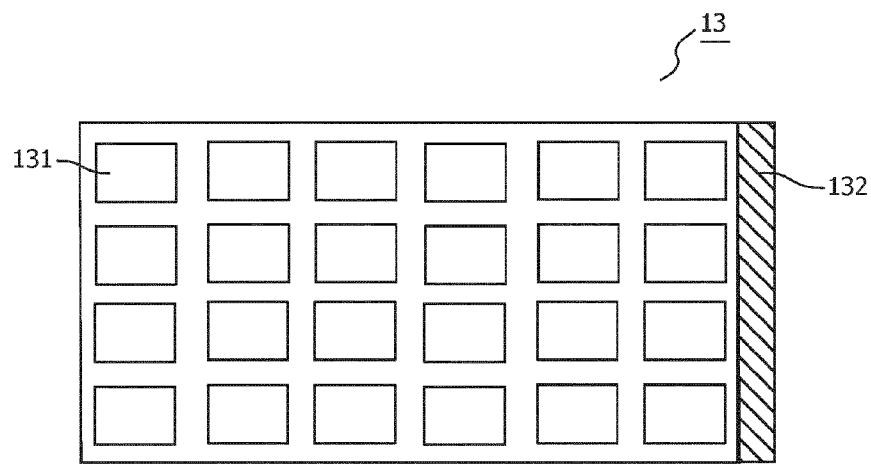
FIG. 4 shows a schematic representation of a pixelated electrode of a direct conversion radiation detector according to the present invention.

The directly converted separated electron-hole pairs are collected by the pixelated second electrode 13 and converted by the integrated circuit 15 into spectral information of the absorbed X-ray quanta. FIG. 4 shows a top view of the second electrode 13 with a grid of transparent pixels 131. In this embodiment the second electrode 13 is electrically connected to the integrated circuit 15 by flexible electrical connection means 132, but other known connection means may be contemplated by the skilled person as well. For a connection of the transparent pixelated second electrode 13, it is necessary to apply re-routing layers (not shown) to re-route every single pixel to the electronics. Also the re-routing materials need to be transparent, for the conductive wires, similar materials as for the electrodes can be used, and for the isolation layer materials such as for instance Silicondioxide ($SiO_2$) or Silicon Nitride ($Si_3N_4$) may be used.

Hybrid embodiments such as the radiation detector shown in FIG. 3 produce at least two separate electronic signals indicative of the detected radiation, which may be used separately or combined to obtain additional and/or improved image data, which will better assist a user with analyzing a scanned object, e.g. allowing a physician to provide a more detailed and/or improved diagnosis of a scanned patient. By both counting the number of photons and the number of electrons, a larger signal is obtained. This effect relies on the fact that prior to reaching an emitting $Ce^{3+}$ ion, the charges always travel a finite distance through the converting material. The ratio between direct and indirection conversion can e.g. be tuned via the $Ce^{3+}$ concentration and also via the $Ce^{3+}$ ionization energy, which in turn can be tuned by varying the host lattice composition, requiring ceramics rather than single crystals.

A higher indirect conversion signal is obtained when choosing a high $Ce^{3+}$ concentration (while not inducing concentration quenching) and a high ionization energy of $Ce^{3+}$ in the excited state.

The radiation detector according to the present invention is particularly suitable for x-ray imaging and computed tomography (CT) imaging, particularly spectral CT imaging, in which x-ray radiation is emitted from a radiation source to the radiation detector. The present invention is also suitable for use in any other imaging system to image an object which uses radiation that may be directly converted into an electronic system by a direct conversion layer, such as single-photon emission computed tomography device (SPECT) or position emission tomography (PET) imaging device or combinations of different types of imaging.

It is particularly interesting to use a hybrid direct-indirect radiation detector according to the present invention, similar to the embodiment depicted in FIG. 3, in Time-of-Flight PET imaging. In PET imaging a radiation detector detects gamma photons emitted consequent to the radioactive decay of a radioactive tracer material which was previously introduced into an object to be scanned (e.g. a patient's organ) to obtain three-dimensional image data of said object. In Time-of-Flight PET imaging a difference in time between the detection, by a pair of detectors, of two simultaneously formed gamma photons may be determined. This information may then be used to more precisely localize a point of origin of the annihilation event that caused the photon emission. Time-of-Flight PET needs high temporal accuracy time stamp to accurately measure the position of the photon emission center on the line-of-response. With the hybrid direct-indirect radiation detector according to the present invention, the indirect conversion process is used to provide the time stamp in PET. Photon emission from garnets is a very fast process, which makes it suitable for Time-of-Flight PET. Additionally, an electrical field separates part of the generated electron-hole pairs for direct detection. As a time stamp is now already available from the indirect conversion process, the speed of the direct conversion process becomes less important, thereby relaxing material requirements and the direct conversion system. However as the number of electrons collected from the direct conversion process is related to the energy of the absorbed radiation, spectral information may also be obtained from the direct conversion process with high energy resolution. This allows obtaining an imaging system with time resolution of Time-of-Flight PET combined with spectral information of X-ray or CT imaging, allowing for even more accurate analysis a scanned object, resulting in e.g. an even further improved diagnosis for a patient.

The present invention also provides another advantage, particularly for PET imaging. Luminescence quenching decreases light yield, but also the decay time, but basically the ratio between the two even remains the same. So the figure of merit for coincidence resolving time (CRT) in PET remains the same. As coincidence resolving time and counting (for energy resolution) are decoupled in case of the present invention, there is now more time to count in case of PET. Therefore the tasks of CRT and energy resolution between scintillation and counting may be distributed. As the decay time of the emission in garnets is rather long (due to trapping of charges), it is a viable option to measure photoconductivity, because a current may be already measured before trapping of the charges occurs, whereas emission of trapped charges and charges that will be trapped only occurs after the charges have been released. The emission is needs to be quenched by at least 50%, but more preferably by at least 90%.

Figure 5:
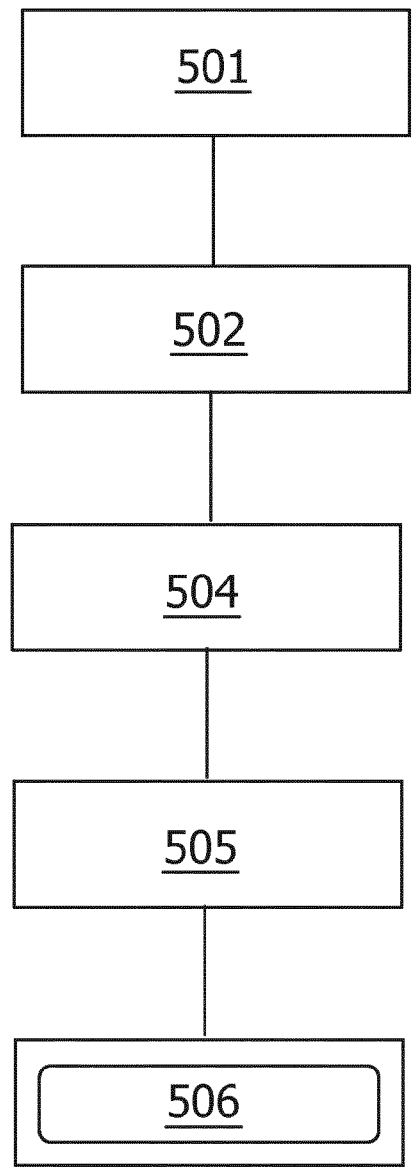
FIG. 5 shows a flowchart for a method for a radiation imaging method according to the present invention.

FIG. 5, which solely includes everything left of the dotted line, shows a schematic depiction of a radiation imaging method according to the present invention. In step 501 radiation is emitted from a source, for instance x-ray radiation or gamma radiation towards a direct conversion radiation detector according to the present invention, so comprising a garnet in the direct conversion layer. In step 502 incoming photons are converted into charge carriers (in this embodiment electrons and holes) in the direct conversion layer. In step 504 a first electronic signal indicative of a number of detected charge carriers is generated (photon counting). In step 505 image data is generated based on the first electronic signal. In step 506 the image data is displayed to a user, e.g. as two or three dimensional images.

Figure 6:
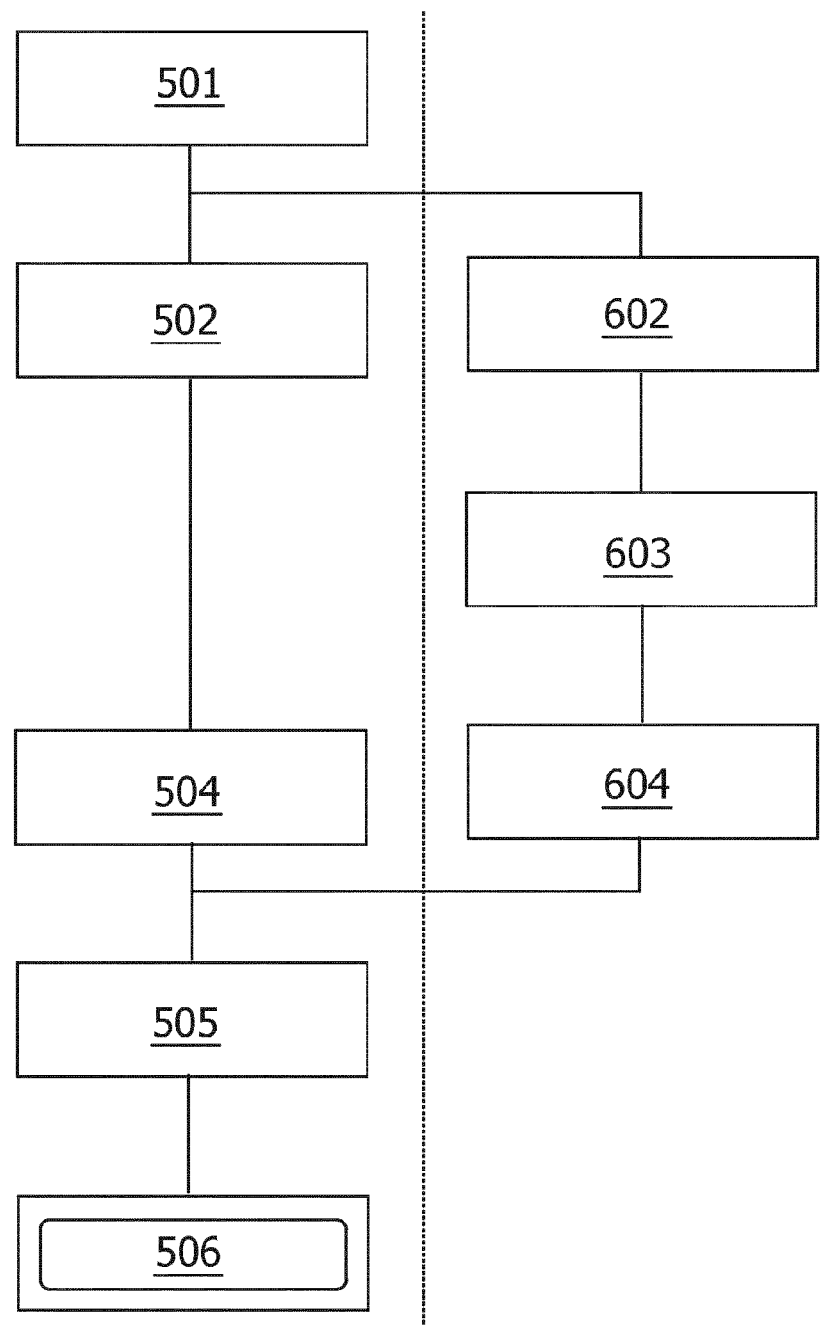
FIG. 6 shows a flowchart for a hybrid radiation imaging method according to the present invention based on FIG. 5 with additional steps.

FIG. 6 depicts a schematic overview of a hybrid radiation imaging method according to the present invention and includes all steps of FIG. 5, as well as all steps right of the dotted line. Direct conversion occurs similar as described for steps 502, 504 and 505 of FIG. 5. In parallel, in step 602, part of the incoming photons cause photoluminescence in the garnet, which then emits photons at a different wavelength, usually in the visible spectrum. In step 603 the photons generated in the garnet are then converted to electrons in a photosensor. In step 604 a second electronic signal indicative of a number of detected charge carriers is generated. In step 505 image data is now generated based on both the first and second electronic signal. Single image data may be generated based on both signals and/or two different sets of image data may be generated based on each of the signals. As with FIG. 5, the image data is displayed to a user in step 506.

Figure 7:
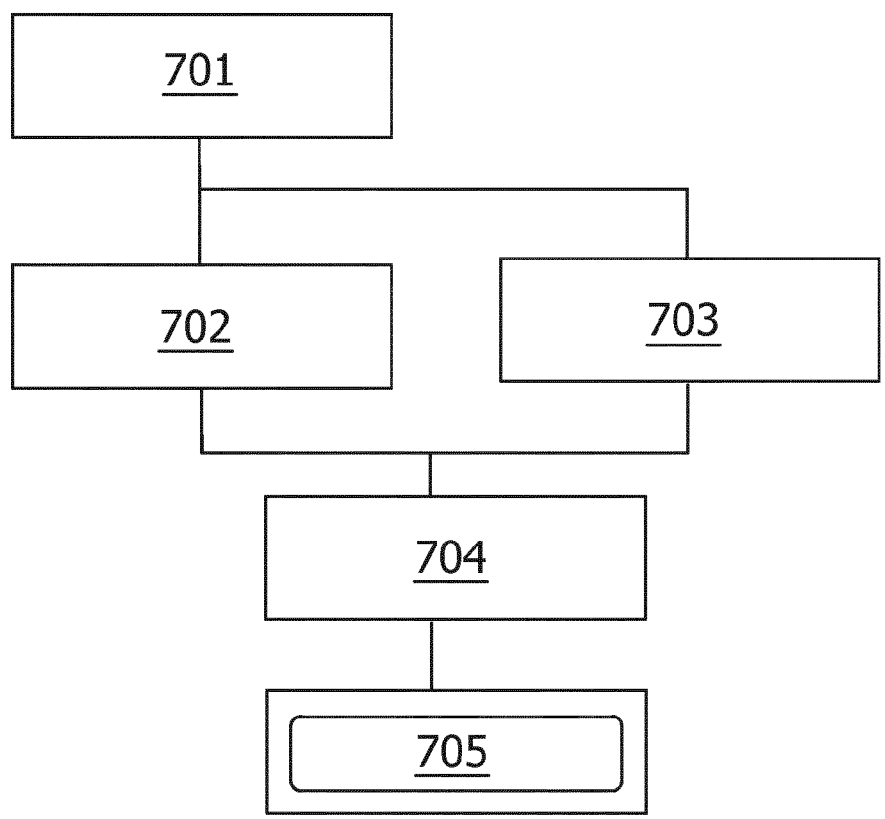
FIG. 7 shows a flowchart for a radiation imaging method wherein the radiation source is a decaying radioactive material according to the present invention.

FIG. 7 depicts a schematic overview of a specific embodiment of the hybrid radiation imaging method according to the present invention wherein the radiation source is a decaying radioactive material, for instance a radioactive tracer in an object. In step 701 the radioactive tracer is detected with a radiation detector according to the present invention that also has an indirect detection option. In step 702 a timestamp is determined from indirectly converted photons. In step 703 spectral information is determined from directly converted photons. In step 704 image data is generated from the spectral information and using the timestamp. In step 705 the image data is displayed to a user.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The invention claimed is:
1. A direct conversion radiation detector comprising:
a direct conversion layer comprising a direct conversion material for directly converting incoming radiation from a radiation source into electron and hole pairs
a first electrode mounted on the direct conversion layer facing the radiation source;
a second electrode mounted on an opposite side of the direct conversion layer compared to the first electrode; and
means for applying an electrical potential between the first electrode and the second electrode,
characterized in that the direct conversion material comprises a garnet with a composition of $Z_3(Al_xGa_y)_5O_{12}$:Ce, wherein Z is Lu, Gd, Y, Tb or combinations thereof and wherein y is equal to or greater than x.
2. The direct conversion radiation detector according to claim 1, wherein the second electrode is pixelated.
3. The direct conversion radiation detector according to claim 1, further comprising a photosensor mounted behind the second electrode with respect to the direct conversion layer for converting visible light formed in the direct conversion layer to an electronic signal, wherein the second electrode is transparent to visible light and wherein y is preferably between 0.4 and 0.6, more preferably y is about 0.5, and/or wherein the garnet is preferably a garnet wherein Z comprises Gd and Lu with a Gd:Lu ratio of about 2:1.
4. The direct conversion radiation detector according to claim 1, further comprising an integrated circuit for processing electronic signals generated in the direct conversion radiation detector.
5. The direct conversion radiation detector according to claim 4, further comprising a transparent re-routing layer for re-routing each pixel of the pixelated electrode to the integrating circuit.
6. A radiation imaging method, comprising the steps of:
emitting a radiation beam from a radiation source;
detecting the emitted radiation beam with a direct conversion radiation detector according to claim 1;

generating a first electronic signal indicative of a number of detected charge carriers generated in the direct conversion layer.

7. The radiation imaging method according to claim 6, wherein the direct conversion radiation detector is a direct conversion radiation detector and a first electronic signal is generated for each detector pixel of the pixelated second electrode.

8. The radiation imaging method according to claim 7, wherein the radiation source is a decaying radioactive material, further comprising the following steps:
- detecting two simultaneously formed photons with at least the radiation detector;
- determining a difference in detection time between the two simultaneously formed photons;
- generating a timestamp based on the determined difference in detection time,
- wherein the step of generating a first electronic signal includes using the generated timestamp as input.

9. The radiation imaging method according to claim 6, wherein the direct conversion radiation detector is a direct conversion radiation detector, further comprising the step of:
generating a second electronic signal indicative of a number of detected electrons generated in the photosensor.

10. The radiation imaging method according to claim 9, further comprising the steps of:
generating image data based on the first electronic signal and on the second electronic signal.

11. The radiation imaging method according to claim 6, further comprising the step of:
generating image data based on the first electronic signal.

12. The radiation imaging method according to claim 11, further comprising the step of:
displaying the image data.

13. A imaging system comprising a direct conversion radiation detector according to claim 1.

14. The imaging system according to claim 13, selected from a group comprising X-ray imaging device, computed tomography imaging device, preferably a spectral computed tomography imaging device, position emission tomography imaging device, preferably a time-of-flight positron emission tomography imaging device, single-photon emission computed tomography device, or combinations thereof.

* * * * *